ary Examiner—Garnette D. Draper
United States Patent [19]

Takagishi et al.

[11] Patent Number: 4,931,515

[45] Date of Patent: Jun. 5, 1990

[54] METHOD FOR PRODUCING ENCAPSULATED SEMICONDUCTOR FROM IMPROVED EPOXY RESINS

[75] Inventors: Hisao Takagishi, Kyoto; Shuichi Kanagawa, Osaka; Kunimasa Kamio, Suita; Kazuo Sumiyoshi, Oita, all of Japan

[73] Assignee: Sumitomo Chemical Company, Limited, Osaka, Japan

[21] Appl. No.: 281,889

[22] Filed: Dec. 8, 1988

Related U.S. Application Data

[63] Continuation of Ser. No. 778,159, Sep. 17, 1985, abandoned, which is a continuation of Ser. No. 593,242, May 26, 1984, abandoned.

[30] Foreign Application Priority Data

Apr. 4, 1983 [JP] Japan ................................ 58-59593

[51] Int. Cl.$^5$ ................................................ C08G 8/00
[52] U.S. Cl. ..................................... 525/504; 525/507; 428/413; 174/137 B; 174/137 R; 174/137 A; 528/87
[58] Field of Search ............... 525/504, 507; 428/413; 174/137 B, 137 R, 137 A

[56] References Cited

U.S. PATENT DOCUMENTS

| | | |
|---|---|---|
| 2,392,309 | 6/1949 | St. Clair . |
| 2,714,098 | 7/1955 | Martin ............................ 525/507 |
| 3,252,850 | 5/1966 | Partansky ........................ 525/507 |
| 3,928,288 | 12/1975 | Walker ............................ 525/504 |
| 4,102,866 | 7/1978 | Speranza et al. .................. 525/507 |
| 4,278,733 | 7/1981 | Benzinger ........................ 428/413 |
| 4,368,298 | 1/1983 | Okayama et al. ................. 525/507 |
| 4,468,508 | 8/1984 | Ito et al. ......................... 525/504 |
| 4,474,929 | 10/1984 | Schrader ......................... 525/507 |
| 4,482,692 | 11/1984 | Bertram et al. .................. 525/504 |

FOREIGN PATENT DOCUMENTS

| | | |
|---|---|---|
| 2220314 | 4/1974 | France . |
| 0083520 | 5/1982 | Japan . |
| 0154984 | 5/1982 | Japan . |
| 0133116 | 8/1982 | Japan . |
| 785930 | 6/1957 | United Kingdom . |
| 2070020 | 9/1981 | United Kingdom . |

OTHER PUBLICATIONS

Epoxy Resins, Chemistry and Technology, edited by Clayton A. May and Yoshio Tanaka.
Patents Abstracts of Japan, vol. 6, No. 231 (C-135) [1109].
Patents Abstracts of Japan, vol. 6, No. 169 (C-122) [1047].

*Primary Examiner*—Garnette D. Draper
*Attorney, Agent, or Firm*—Wenderoth, Lind & Ponack

[57] ABSTRACT

An epoxy resin composition comprising a novolak type epoxy resin which is produced from a substituted-phenol novolak and epihalohydrin, and is 0.15 or less in a maximum absorbance of a 3% (W/V) dichloromethane solution of the epoxy resin, the absorbance being measured at a wave number of between 3570 and 3600 cm$^{-1}$ with an infrared spectrophotometer having a cell of 2 mm length, which is useful particularly in encapsulating and laminating applications in electronic fields.

4 Claims, No Drawings

METHOD FOR PRODUCING ENCAPSULATED SEMICONDUCTOR FROM IMPROVED EPOXY RESINS

This application is a continuation of now abandoned application Ser. No. 06/778,159, filed Sept. 17, 1985, which in turn is a continuation of application Ser. No. 06/593,242, filed May 26, 1984, both applications being now abandoned.

The present invention relates to an epoxy resin composition useful particularly in encapsulating and laminating applications in electronic fields.

Various kinds of epoxy resin are so far widely used for paints and adhesives, as well as in laminating, molding and casting applications, because of the cured product being superior in various characteristics such as chemicals resistance, mechanical properties, electric properties, thermal resistance, water resistance, adhesive properties and the like.

Also, a certain epoxy resin is used for encapsulating semiconductor chips such as transistors, IC, ISI, etc. In recent years, however, more reliability on the cured epoxy resin has been required with the increase in the degree of integration of semiconductor chips. Accordingly, there is needed an improvement in epoxy resins, particularly those usable in encapsulating and laminating electronic parts in respect to the properties of the cured products e.g. the electric properties, thermal resistance, water resistance, etc. In order to meet these requirements, studies are being made to improve the said properties, for example, by minimizing the content of ionic impurities (e.g. alkali metal halides) and hydrolyzable chlorine-containing resins in the desired epoxy resin, but the results are not yet satisfactory.

The present inventors have extensively studied novolak type epoxy resin composition in an effort to improve the said properties, and found that phenolic and alcoholic hydroxyl groups-containing substances, produced as by-products during the production of epoxy resins exert adverse effects on such properties as the electric properties, the thermal resistance, the water resistance, etc.

The present invention provides an epoxy resin composition comprising a novolak type epoxy resin which is produced from a substituted-phenol novolak and epihalohydrin, and is 0.15 or less in the maximum absorbance of a 3% (W/V) dichloromethane solution of the epoxy resin, the absorbance being measured at a wave number of between 3570 and 3600 $cm^{-1}$ with an infrared spectrophotometer having a cell of 2 mm length, and a method for producing products perticularly useful in electronic fields, which comprises curing the above epoxy resin composition.

The present invention is explained in detail as follows.

Substituted phenols usable for production of the substituted-phenol novolak include alkyl, alkenyl, allyl, aryl, aralkyl or halogen-substituted phenols. Examples thereof are cresol, xylenol, ethylphenol, isopropylphenol, butylphenol, octylphenol, nonylphenol, vinylphenol, isopropenylphenol, allylphenol, phenylphenol, benzylphenol, chlorophenol, and bromophenol and the like (these compounds include o-, m- and p-isomers). Of these compounds, cresol particularly o-cresol is preferably used.

The substituted-phenol novolak can be obtained by condensing the substituted phenol with formaldehyde in the presence of an acid or alkali catalyst in a conventional manner. There may be used a mixture of the substituted phenols and other phenols such as phenol, resorcinol, hydroquinone, catechol, etc. in such amounts as not to damage the effect of the present invention (generally, not more than 50 mole % per mole of the total phenols).

The novolak type epoxy resin of the present invention can be prepared by reacting the substituted-phenol novolak with epihalohydrin, preferably epichlorohydrin, in the presence of an alkali such as sodium hydroxide. The main reaction of this reaction is the formation of a desired glycidyl ether by the reaction of a phenolic hydroxyl group-containing compound with epichlorohydrin. However, this reaction is always followed by various side reactions such as the reaction between the formed glycidyl ether and a phenolic hydroxyl group-containing compound which remains unreacted, as well as the hydrolysis product(s) of the formed glycidyl ether, and the like. Moreover, the reaction between the substituted phenol novolak and epihalohydrin can be carried out in the presence of alcohols, such as methyl alcohol, propyl alcohol and the like. This reaction is also followed by side reactions such as the reaction between the formed diglycidyl ether and the alcohol. Further, the starting phenolic hydroxyl group-containing compound may remain unreacted.

For the reasons described above, the desired epoxy resin may be contaminated with alcoholic or phenolic hydroxyl group-containing substances. These hydroxyl group-containing substances have an absorption band within a wave number of between 3570 and 3600 $cm^{-1}$ in the infrared absorption spectrum.

The novolak type epoxy resin usable in the present invention is one having a maximum absorbance of 0.15 or less, preferably 0.1 or less, as measured under conditions described below.

A 3% (W/V) dichloromethane solution of the novolak type epoxy resin is prepared and put in a KBr cell of 2 mm length and measured for its infrared absorption spectrum at 100 integration frequencies using as Fourier transformation type infrared spectrophotometer (for example, NICOLET 5DX made by Nicolet Co.). A maximum value of absorbance at a wave number of between 3570 and 3600 $cm^{-1}$ is obtained in comparison with the blank (dichloromethane), provided that both the gain and the reference correction factor on the measurement are taken as 1.

The performances of the cured products can be increased with a decrease in the maximum absorbance of the novolak type epoxy resin within a range of 0.15 or less. On the other hand, when the maximum absorbance exceeds 0.15, the performances can not be improved. For example, there is no significant difference between a performances of cured products obtained from those epoxy resins having the maximum absorbance of 0.2 and 0.3.

A curing agent usable in the present invention includes, for example, amines such as diaminodiphenylmethane, diaminodiphenyl sulfone, etc.; novolak type phenol resins such as phenol novolak, cresol novolak, etc. and resol type phenol resins; polyphenols such as poly-p-vinylphenol resins, etc.; and acid anhydrides.

The epoxy resin composition of the present invention can be readily prepared by mixing the novolak type epoxy resin defined above with the above curing agent.

The present composition may contain conventional additives such as fillers, curing accelerators, release agents fire retardants, surface-processing agents, etc. from which a suitable additive or additives may be chosen depending on the application purposes. The filler includes silica, alumina, talc, clay, glass fiber, etc., the curing accelerator includes imidazoles, tertiary amines, etc., and the release agent includes waxes, metallic salts of fatty acid such as zinc stearate, etc. The flame retardant includes antimony trioxide, brominated epoxy resins, phosphorus compounds, etc., and then surface-processing agent includes a silane coupling agent, etc.

In addition to the conventional additives described above, known epoxy resins such as bisphenol A type epoxy resins, polyol diglycidyl ethers, polycarboxylic acid diglycidyl ethers, etc. may be added to the epoxy resin composition of the present invention according to the object.

The epoxy resin composition can be prepared in a manner such that a mixture of the novolak type epoxy resin defined above and the additives, if desired together with other known epoxy resin is melt-kneaded on a roll or an extruder, and the resulting melt is cooled and then pulverized.

The epoxy resin composition of the present invention may be useful particularly for the encapsulation of electronic parts such as semiconductors as well as the production of laminates.

The encapsulation of electronic parts can be carried out using the resin composition of the present invention in a conventional manner such as in transfer molding, compression molding, injection molding and the like.

The production of laminates can be carried out by uniformly dissolving the present resin composition in a solvent (e.g. methyl ethyl ketone, toluene, ethylene glycol monomethyl ether), impregnating the resulting solution into reinforcing substrates such as glass fibers or organic fibers, and heat-drying the resultants to obtain a pre-preg, which is then molded on a press to obtain laminates. By this method, laminates superior in moisture resistance, electric characteristics, etc. can be obtained.

The present invention will be illustrated with reference to the following Examples. All parts in these Examples are by weight.

REFERENCE EXAMPLE

To a reactor equipped with a thermometer, stirrer, dropping funnel and apparatus for recovering water produced by reaction, were added 360 parts of o-cresol novolak having a hydroxyl value of 120 and a softening point of 98° C. and 2775 parts of epichlorohydrin, and the novolak was dissolved by stirring. The contents of the reactor was then heated to 105° C., and 275 parts of a 48% aqueous sodium hydroxide solution was added dropwise over 4 hours. During this period, the temperature of the reaction system was kept at 105° to 110° C., water produced by the reaction and water contained in the sodium hydroxide solution was distilled out of the reaction system in the form of an azeotropic mixture with epichlorohydrin, the vapor of the mixture was condensed and epichlorohydrin in the condensed liquor was returned to the reaction system.

After the dropwise addition was completed, epichlorohydrin present in excess was removed by evaporation, and 1230 parts of methyl isobutyl ketone was added to the reaction mixture containing the formed resin and sodium chloride to dissolve the resin in the solvent. The insolubles were removed by filtration at 75° to 80° C. The filtrate was put into a separate reactor and 100 parts of n-heptane was added dropwise over 1 hour at room temperature with stirring. After 30 minutes' standing, the insolubles were removed by filtration, and the filtrate was concentrated to obtain the epoxy resin shown in Table 1.

In a manner similar to that described above, epoxy resins, b to e, shown in Table 1 were prepared. For the purpose of comparison, epoxy resins outside the scope of the present invention, f to h, shown in Table 1 were prepared.

TABLE 1

| | | Item | | | |
|---|---|---|---|---|---|
| | | Contents in the resin | | | |
| Sample | Absorbance* | Water** (%) | Hydrolyzable chlorine (ppm) | Na+ (ppm) | Cl− (ppm) |
| Epoxy resin a | 0.12 | 0.05 | 380 | <1 | 1 |
| Epoxy resin b | 0.07 | 0.04 | 450 | <1 | 1 |
| Epoxy resin c | 0.09 | 0.05 | 430 | 1 | 2 |
| Epoxy resin d | 0.15 | 0.06 | 390 | <1 | <1 |
| Epoxy resin e | 0.10 | 0.05 | 410 | 1 | 1 |
| Epoxy resin f | 0.19 | 0.06 | 420 | <1 | <1 |
| Epoxy resin g | 0.23 | 0.05 | 410 | 1 | 2 |
| Epoxy resin h | 0.31 | 0.05 | 390 | <1 | 1 |

*Measured using a NICOLET 5DX made by Nicolet Co., as a Fourier transformation type infrared spectrophotometer.
**Measured by the Karl Fischer's method. Under the measuring conditions defined in the present invention, the absorbance can not be affected by water, as far as its content is not more than 0.1%.

EXAMPLES AND COMPARATIVE EXAMPLES

To 100 parts each of the epoxy resins shown in Table 1 were added 17 parts of Sumi-epoxy ESB-400 (tetrabromobisphenol A type epoxy resin having a bromine content of 48%; a commercial product of Sumitomo Chemical Company, Limited), 55 parts of a phenol novolak resin having a molecular weight of 800, 400 parts of silica powder, 2 parts of SumiCure D [2,4,6-tris(dimethylaminomethyl)phenol; a commercial product of Sumitomo Chemical Company, Limited)], 2 parts of carnauba wax, 1 part of calcium stearate, 49 parts of antimony trioxide and 1.5 parts of a silane coupling agent (KBM 403; a commercial product of Shin'etsu Kagaku Co.), and each mixture was well mixed to obtain each resin composition.

Each composition was heated and kneaded on a roll, and pulverized to prepare each molding material. Using the molding material thus prepared, transfer molding was carried out at a molding condition of 170° C./3 minutes. The molded products obtained were postcured for 5 hours in an oven kept at 180° C., and then measured for the physical properties according to JIS K-6911. The results are shown in Table 2.

TABLE 2

| | | Example | | | | | Comparative example | | |
|---|---|---|---|---|---|---|---|---|---|
| Epoxy resin used | | a | b | c | d | e | f | g | h |
| Reactivity | 165° C. (sec) | 31 | 29 | 31 | 32 | 31 | 32 | 33 | 31 |
| | 150° C. (sec) | 40 | 41 | 39 | 40 | 40 | 41 | 41 | 40 |
| | 130° C. (sec) | 115 | 112 | 113 | 113 | 111 | 114 | 116 | 112 |

TABLE 2-continued

| Epoxy resin used | | Example | | | | | Comparative example | | |
|---|---|---|---|---|---|---|---|---|---|
| | | a | b | c | d | e | f | g | h |
| Physical property | Heat distortion temperature (°C.)* | 189 | 194 | 192 | 186 | 189 | 184 | 184 | 179 |
| | Tg** | 213 | 219 | 216 | 211 | 214 | 211 | 209 | 203 |
| | Dielectric breakdown strength (KV/mm) | 14.3 | 14.9 | 15.0 | 14.0 | 14.6 | 14.0 | 13.5 | 13.3 |
| | Volume resistivity (Ω-cm) | $7.0 \times 10^{15}$ | $7.8 \times 10^{15}$ | $7.7 \times 10^{15}$ | $6.6 \times 10^{15}$ | $7.0 \times 10^{15}$ | $4.6 \times 10^{15}$ | $5.1 \times 10^{15}$ | $4.0 \times 10^{15}$ |
| | Specific gravity (at 20° C.) | 2.00 | 2.01 | 2.01 | 2.00 | 1.99 | 2.00 | 1.98 | 2.02 |

*Load, 100 kg/cm$^2$ (according to JIS C-2241)
**Obtained from the data of dynamic viscoelasticity.

As shown in Table 2, there is no difference in the reactivity between the cured products of the present Examples and those of Comparative Examples, but the cured products of the present invention are superior in thermal resistance and electric properties to the comparative ones.

The cured products obtained in Examples and Comparative Examples were measured for a volume resistivity at high temperature (150° C.). The results are shown in Table 3.

TABLE 3

| | Epoxy resin used | Volume resistivity at 150° C. (Ω-cm) |
|---|---|---|
| Example | a | $5.6 \times 10^{13}$ |
| | b | $8.1 \times 10^{13}$ |
| | c | $7.9 \times 10^{13}$ |
| | d | $4.0 \times 10^{13}$ |
| | e | $7.8 \times 10^{13}$ |
| Comparative Example | f | $2.2 \times 10^{12}$ |
| | g | $2.5 \times 10^{12}$ |
| | h | $7.0 \times 10^{11}$ |

As shown in Table 3, the epoxy resin cured products of the present invention show excellent electric properties even at high temperatures.

Further, the cured products obtained were measured for the percent water-absorption and a reduction in the volume resistivity by the pressure cooker test (PCT) for testing moisture resistance. The PCT was carried out for of 200 hours' at 121° C.×2 atm.

The results are shown in Table 4.

TABLE 4

| | Epoxy resin used | Volume resistivity (Ω-cm) | Percent water absorption (%)* |
|---|---|---|---|
| Example | a | $1.3 \times 10^{12}$ | 0.85 |
| | b | $5.8 \times 10^{12}$ | 0.72 |
| | c | $5.2 \times 10^{12}$ | 0.77 |
| | d | $1.0 \times 10^{12}$ | 0.91 |
| | e | $5.1 \times 10^{12}$ | 0.85 |
| Comparative Example | f | $1.6 \times 10^{11}$ | 1.22 |
| | g | $1.9 \times 10^{11}$ | 1.29 |
| | h | $9.8 \times 10^{10}$ | 1.36 |

*A rate of weight gain.

As shown in Table 4, the epoxy resin cured products of the present invention are superior in moisture resistance. In other words, the percent water-absorption is small, and besides, a reduction in the volume resistivity after the moisture resistance test is also small.

We claim:

1. In a method for producing an encapsulated semiconductor which comprises encapsulating a semiconductor with an epoxy resin composition, said epoxy resin composition comprising a novolak type epoxy resin produced from a substituted-phenol novolak and epihalohydrin, the improvement wherein said epoxy resin is selected so as to have a hydroxyl group-containing substance content which corresponds to a maximum absorbance of 0.15 or less as measured in a 3% (W/V) dichloromethane solution of the epoxy resin by measuring the absorbance of said 3% (W/V) dichlormethane solution of the epoxy resin at a wave number of between 3570 and 3600 cm$^{-1}$ with an infrared spectrophotometer having a cell of 2 mm length.

2. A method according to claim 1 wherein the epoxy resin composition comprises a curing agent selected from the group consisting of amines, phenol resins, polyphenols and acid anhydrides.

3. A method according to claim 2 wherein said resin composition comprises at least one additive selected from the group consisting of fillers, curing accelerators, release agents, fire retardants and surface-processing agents.

4. An encapsulated semiconductor obtained by the method of claim 1.

* * * * *